(12) United States Patent
Carter et al.

(10) Patent No.: US 11,868,600 B2
(45) Date of Patent: Jan. 9, 2024

(54) RANKED CHOICE ON AN ABSOLUTE SCALE

(71) Applicant: Toyota Research Institute, Inc., Los Altos, CA (US)

(72) Inventors: Scott Carter, San Jose, CA (US); Alex Filipowicz, Mountain View, CA (US); Shabnam Hakimi, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/393,714

(22) Filed: Aug. 4, 2021

(65) Prior Publication Data
US 2023/0039139 A1    Feb. 9, 2023

(51) Int. Cl.
*G06F 3/04847* (2022.01)
*G06F 18/2113* (2023.01)
*G06F 3/038* (2013.01)

(52) U.S. Cl.
CPC .......... *G06F 3/04847* (2013.01); *G06F 3/038* (2013.01); *G06F 18/2113* (2023.01)

(58) Field of Classification Search
None
See application file for complete search history.

(56) References Cited

U.S. PATENT DOCUMENTS

| | | | |
|---|---|---|---|
| 5,774,121 A * | 6/1998 | Stiegler | G06Q 10/10 706/46 |
| 7,533,354 B2 * | 5/2009 | Sharp | G06Q 10/00 715/810 |
| 7,676,446 B2 | 3/2010 | Zangwill | |
| 8,832,752 B2 | 9/2014 | Cvijetic et al. | |
| 9,949,691 B2 | 4/2018 | Huppert et al. | |
| 10,049,135 B2 | 8/2018 | Whitley, Jr. | |
| 10,642,471 B2 * | 5/2020 | Robertson | G06F 3/04847 |
| 10,733,656 B1 * | 8/2020 | Price | G06Q 30/0631 |
| 2012/0246579 A1 * | 9/2012 | Byrne | G06Q 50/01 715/753 |
| 2014/0168124 A1 * | 6/2014 | Park | G06F 3/016 345/173 |
| 2021/0022658 A1 | 1/2021 | Palmer | |

OTHER PUBLICATIONS

Use slider scales for a more accurate rating (https://www.questionpro.com/blog/use-slider-scales-for-a-more-accurate-rating/), accessed Jun. 3, 2021.

* cited by examiner

*Primary Examiner* — Henry Orr
(74) *Attorney, Agent, or Firm* — DINSMORE & SHOHL LLP (57) ABSTRACT

Methods, systems, and non-transitory machine-readable mediums for ranking on an absolute scale include displaying, on an electronic display, a first handle, a second handle, and an interactor, determining a value of the first handle and a value of the second handle based on their respective positions on the interactor, in response to a user dragging the first and second handles on the interactor, and determining a rank of the first and second handles based on the values of the first and second handles, in response to the user dragging the first and second handles on the interactor.

20 Claims, 5 Drawing Sheets

RANKED CHOICE ON AN ABSOLUTE SCALE

TECHNICAL FIELD

The present disclosure relates to the field of human-computer interaction, and more particularly to interfaces for assigning ranked values and absolutes values to handles on a sliding scale.

BACKGROUND

When conducting surveys, researchers often want to establish both a relative ranking of each choice as well as an absolute value of the importance of each choice. A ranking of each choice often represents a user's feelings towards a choice relative to the others. However, this may not capture the degree to which the user may prefer the choice. For example, asking a user to rank 5 choices does not convey the degree to which the user prefers the first choice over the second. On the other hand, an absolute value of each choice often represents the degree to which the user likes or dislikes an option. However, this may not capture the user's feelings towards a choice relative to the others without potentially mischaracterizing the user's feelings. For example, asking a user to assign a number 1 through 5 for each of 5 choices, where 1 represents strongly disliking the choice and 5 represents strongly liking the choice, does not convey which choice the user likes the most if the user likes all the choices. In the same example, if the user assigns each of the 5 choices a unique value, then the user's feelings towards a choice may be mischaracterized as some choices may be assigned a value representing dislike when really the user likes all of the choices to some degree.

Current methods require that users make absolute and relative (i.e., ranking) choices separately, which consumes time, effort, and attention. Getting the information to establish both rankings and absolute values requires putting together several questions. This may be burdensome and tedious for researchers and users. After receiving the answers for the several questions, the researchers may have to synthesize the answers to get the desired metric, which complicates what should be a simple task. Furthermore, some information, such as the subsets of choices being more important than others, may be entirely lost in the process.

Therefore, there is a need for alternative processes of ranking choices on an absolute scale that is faster and imposes a lower cognitive load on users.

SUMMARY

In accordance with one embodiment of the present disclosure, a method for ranking on an absolute scale includes displaying, on an electronic display, a first handle, a second handle, and an interactor, determining a value of the first handle and a value of the second handle based on their respective positions on the interactor, in response to a user dragging the first and second handles on the interactor, and determining a rank of the first and second handles based on the values of the first and second handles, in response to the user dragging the first and second handles on the interactor.

In accordance with another embodiment of the present disclosure, a system for ranking on an absolute scale includes a processor, an electronic display, a memory module communicatively coupled to the processor, and a set of machine-readable instructions stored on the memory module. The machine-readable instruction, when executed by the processor, cause the processor to perform operations including displaying, on the electronic display, a first handle, a second handle, and an interactor, determining a value of the first handle and a value of the second handle based on their respective positions on the interactor, in response to a user dragging the first and second handles on the interactor, and determining a rank of the first and second handles based on the values of the first and second handles, in response to the user dragging the first and second handles on the interactor.

In accordance with yet another embodiments of the present disclosure, a non-transitory machine-readable medium includes machine-readable instructions that, when executed by a processor, cause the processor to perform operations including displaying, on an electronic display, a first handle, a second handle, and an interactor, determining a value of the first handle and a value of the second handle based on their respective positions on the interactor, in response to a user dragging the first and second handles on the interactor, and determining a rank of the first and second handles based on the values of the first and second handles, in response to the user dragging the first and second handles on the interactor.

Although the concepts of the present disclosure are described herein with primary reference to surveys, it is contemplated that the concepts will enjoy applicability to any user interface. For example, it is contemplated that the embodiments of the present disclosure will have applicability to conducting research surveys, as well as user interfaces in general.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 2A:
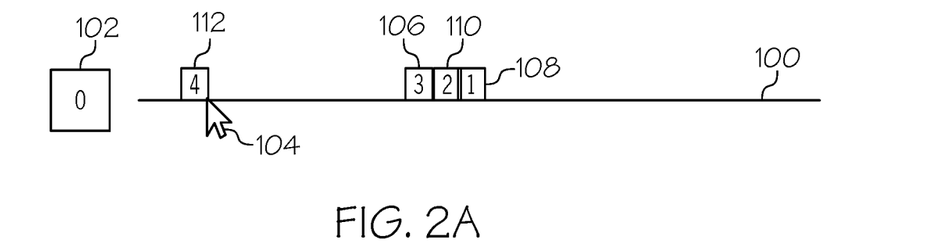
FIG. 2A depicts an interactor with a group of handles and a cursor away from the group of handles, according to one or more embodiments shown and described herein.
Figure 2B:
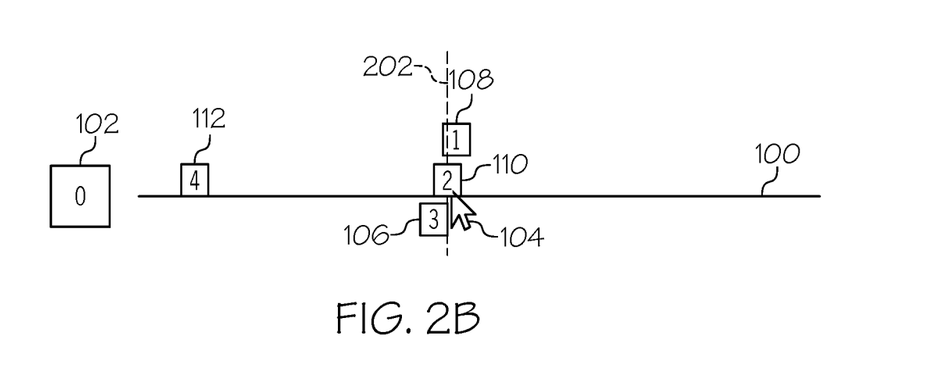
FIG. 2B depicts an interactor with a group of handles and a cursor near the group of handles, according to one or more embodiments shown and described herein.
Figure 3A:
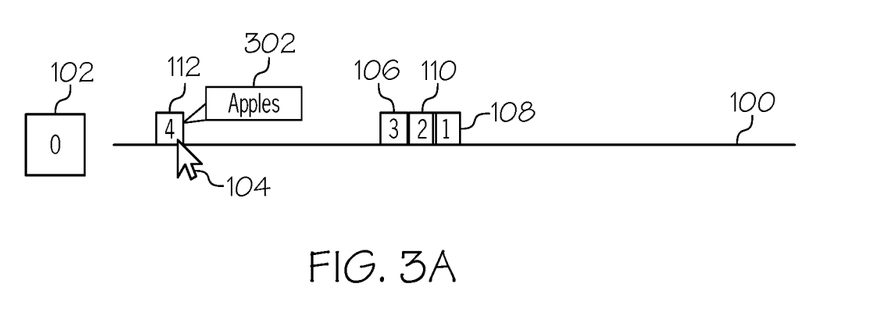
FIG. 3A depicts an interactor with a group of handles and a cursor hovering over a handle away from the group of handles, according to one or more embodiments shown and described herein.
Figure 3B:
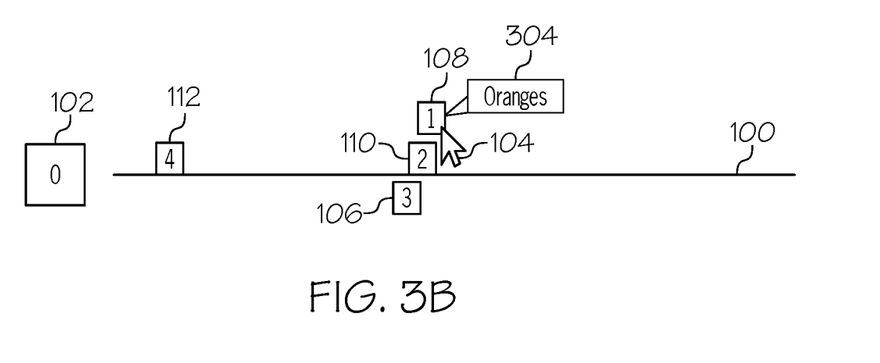
FIG. 3B depicts an interactor with a group of handles and a cursor hovering over the group of handles, according to one or more embodiments shown and described herein.

The embodiments disclosed herein include systems, methods, and non-transitory machine-readable mediums for ranking on an absolute scale. Particularly, embodiments may include a user interface having a sliding scale (an "interactor"). The interactor may have a minimum value and a maximum value, a number of choices represented as handles, and metadata for each choice. Various user interactions with the interactor and handles are illustrated in FIGS. 1-4. In one type of interaction, a user may drag a handle onto an interactor, as shown in FIG. 1. Dragging a handle onto the interactor assigns the handle a rank and an absolute value based at least in part on where the handle is placed on the interactor. Subsequent handles dragged onto the interactor may cause the ranks and absolute values of the other handles on the interactor to change accordingly. In another type of interaction, when the handle is placed in a position within a threshold distance of other handles on the interactor, the interactor may reposition the handles such that they do not overlap, as shown in FIG. 2. In yet another type of interaction, the user may hover with a cursor over a handle on the interactor to view metadata associated with the handle, as shown in FIG. 3.

Compared with existing survey interfaces, embodiments of the present disclosure have several advantages over existing methods. Embodiments may capture the user's feelings towards one choice in relation to the other choices while also capturing the degree to which the user prefers one choice over another. For example, two handles dragged to the right end of the interactor and one handle dragged to the left end of the interactor may indicate that the user likes the first two options almost identically but strongly dislikes the third option. Embodiments of the present disclosure simplify the surveying process for researchers by reducing the number of questions that are asked to obtain similar data, which allows researchers to ask more comprehensive questions and gather more meaningful data in a single question. Additionally, embodiments impose a lower cognitive load on users by reducing the number of questions asked on a survey, which allows researchers to obtain more respondents willing to complete a survey.

Referring now to FIGS. 1A-1E, an example embodiment of ranking and assigning a value to four handles 106, 108, 110, 112 on an interactor 100 is depicted. It should be understood that the embodiment as shown in FIGS. 1A-1E is intended to be exemplary and is not intended to be limiting. The location, orientation, and design of the interactor 100 is arbitrary, as is its configuration (e.g., minimum value, maximum value, increments, etc.). The location, orientation, and design of the handle starting location 102 and handles are arbitrary, as are their configuration. Additionally, embodiments are not limited to four handles nor are embodiments limited to how they are placed onto the interactor 100. For example, a cursor 104 may not be included if the example embodiment of FIGS. 1A-1E is implemented on a touch screen.

Figure 1A:
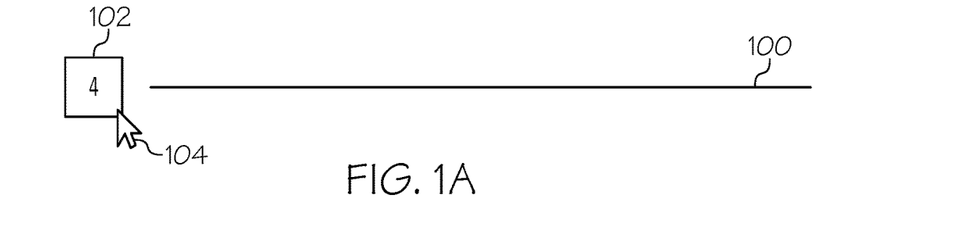
FIG. 1A depicts an interactor and a handle starting location, according to one or more embodiments shown and described herein.

Referring now to FIG. 1A, an interactor 100 and a handle starting location 102 are depicted. The interactor 100 may be configured to have a minimum value corresponding to a first end of the interactor 100 and a maximum value corresponding to a second end of the interactor 100. The interactor 100 may be a spectrum between the minimum value and the maximum value such that locations between the first and second ends of the interactor 100 represent a value corresponding to the distance from the first and/or second ends of the interactor 100. For example, if an interactor 100 has a minimum value of 0 and a maximum value of 100, the value on the furthest left end of the interactor 100 may be 0, the value on the furthest right end of the interactor 100 may be 100, and the value on the middle of the interactor 100 may be 50. In some embodiments, the values between the maximum and minimum may be in incremental values. For example, instead of each position between the two ends of the interactor 100 representing an increment of 1 between 0 and 100, each position between the two ends of the interactor 100 may represent an increment of 5.

The interactor 100 may also be configured to have a predetermined number of handles that may be placed on the interactor 100. Handles may be stored at a handle starting location 102. In some embodiments, the handles may be initially arranged on the interactor 100 for the user to reposition as desired. The handle starting location 102 may include an indicator that displays how many handles may be placed on the interactor 100. For example, in FIG. 1A, the handles are stored at a handle starting location 102 that indicates that four handles are available to be dragged onto interactor 100. The cursor 104 is hovering over the handle starting location 102 in preparation for dragging the first handle onto interactor 100.

Figure 1B:
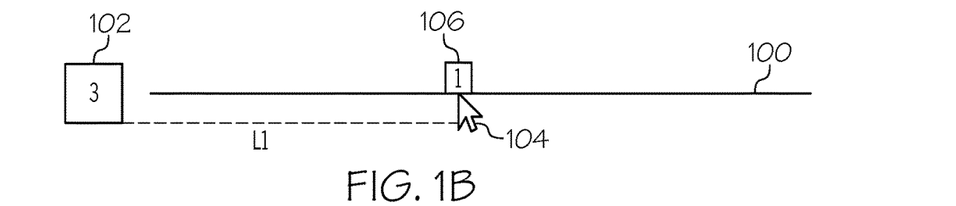
FIG. 1B depicts an interactor with one handle and a handle starting location, according to one or more embodiments shown and described herein.

Referring now to FIG. 1B, an interactor 100 with one handle 106 and a handle starting location 102 is depicted. Handles may be dragged from the handle starting location 102 onto a position on the interactor 100. Dragging a handle onto the interactor 100 may comprise clicking on the handle starting location 102 with the cursor 104 and dragging from the handle starting location 102 to a location on the interactor 100. In some embodiments, the handle 106 may emerge from the handle starting location 102 and following the cursor 104 as it is being dragged onto the interactor 100. When the handle 106 is dragged away from the handle starting location 102, the handle starting location 102 may indicate a new number of available handles. When the handle 106 is dropped onto the interactor 100, the handle 106 may be assigned an absolute value based at least in part on its position on the interactor 100 and may be assigned a first rank. In some embodiments, the absolute value may be displayed based at least in part on the position of the handle as its being dragged.

For example, FIG. 1B depicts the interactor 100 of FIG. 1A with one handle 106. The cursor 104 began at the handle starting location 102, as shown in FIG. 1A, clicked the handle starting location 102 and dragged a first handle 106 from the handle starting location 102 a distance L1 onto the interactor 100. After the dragging began, the handle starting location 102 indicates that one less handle is available for placing on the interactor 100 by showing that only 3 handles remain available. When the first handle 106 is dropped onto the interactor 100, the first handle 106 is assigned an absolute value of 60 based on its position on the interactor 100 and is assigned a rank of 1 because it is the only handle on the interactor 100.

Figure 1C:
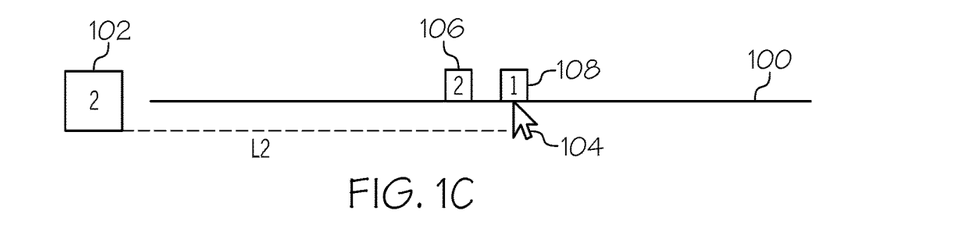
FIG. 1C depicts an interactor with two handles and a handle starting location, according to one or more embodiments shown and described herein.

Referring now to FIG. 1C, an interactor 100 with two handles 106, 108 and a handle starting location 102 are depicted. Additional handles may be dragged from the handle starting location 102 onto a position on the interactor 100. Dragging a second handle 108 onto the interactor 100 may comprise a similar set of actions as in FIG. 1B for dragging the first handle 106 onto the interactor 100. When the handle 108 is dropped onto the interactor 100, the handle 108 may be assigned an absolute value based at least in part on its position on the interactor 100 and may be assigned a rank based at least in part on its position relative to the other handles on the interactor 100.

For example, FIG. 1C depicts the interactor 100 of FIG. 1B but with two handles 106, 108. The cursor 104 began at the handle starting location 102, clicked the handle starting location 102, and dragged a second handle 108 from the handle starting location 102 a distance L2 onto the interactor 100. The distance L2 is greater than the distance L1. After dragging began, the handle starting location 102 indicated that one less handle is available for placing on the interactor 100 by showing that only 2 handles remain available. When the second handle 108 is dropped onto the interactor 100, the second handle 108 is assigned an absolute value of 70 based on its position on the interactor 100 and is assigned a rank of 1 because it is placed closer to the right end of the interactor 100 and thus has a higher absolute value than the first handle 106. Accordingly, the rank of the first handle 106 is changed to 2.

Figure 1D:
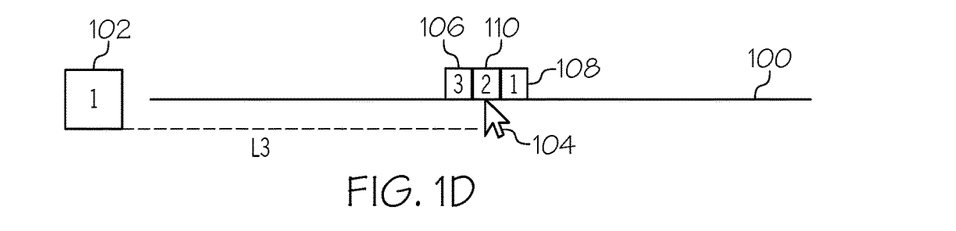
FIG. 1D depicts an interactor with three handles and a handle starting location, according to one or more embodiments shown and described herein.

Referring now to FIG. 1D, an interactor 100 with three handles 106, 108, 110 and a handle starting location 102 are depicted. Dragging a third handle 110 onto the interactor 100 may comprise a similar set of actions as in FIGS. 1B-1C. When the handle 110 is dropped onto the interactor 100, the handle 110 may be assigned an absolute value based at least in part on its position on the interactor 100 and may be assigned a rank based at least in part on its position relative to the other handles 106, 108 on the interactor 100.

For example, FIG. 1D depicts the interactor 100 of FIG. 1C but with three handles 106, 108, 110. The cursor 104 began at the handle starting location 102, clicked the handle starting location 102, and dragged a third handle 110 from the handle starting location 102 a distance L3 onto the interactor 100. The distance L3 is greater than the distance L1 but less than the distance L2. After dragging began, the handle starting location 102 indicated that one less handle is available for placing on the interactor 100 by showing that only 1 handle remains available. When the third handle 110 is dropped onto the interactor 100, the third handle 110 is assigned an absolute value of 65 based on its position on the interactor 100 and is assigned a rank of 2 because it is placed closer to the right end of the interactor 100 than the first handle 106 but not as far to the right end of the interactor 100 as the second handle 108. Accordingly, the rank of the first handle 106 is changed to 3.

Figure 1E:
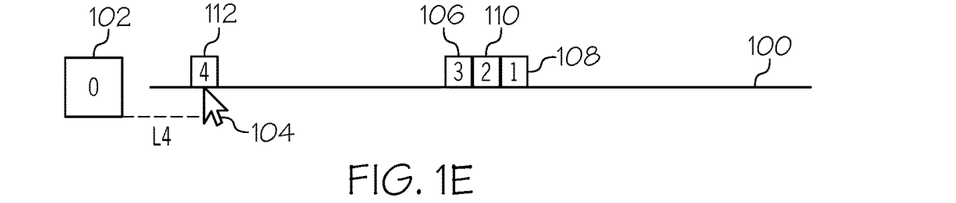
FIG. 1E depicts an interactor with four handles and a handle starting location, according to one or more embodiments shown and described herein.

Referring now to FIG. 1E, an interactor 100 with four handles 106, 108, 110, 112 and a handle starting location 102 is depicted. Dragging a fourth handle 112 onto the interactor 100 may comprise a similar set of actions as in FIGS. 1B-1D. When the handle 112 is dropped onto the interactor 100, the handle 112 may be assigned an absolute value based at least in part on its position on the interactor 100 and may be assigned a rank based at least in part on its position relative to the other handles 106, 108, 110 on the interactor 100.

For example, FIG. 1E depicts the interactor 100 of FIG. 1D but with four handles 106, 108, 110, 112. The cursor 104 began at the handle starting location 102, clicked the handle starting location 102, and dragged a fourth handle 112 from the handle starting location 102 a distance L4 onto the interactor 100. The distance L4 is less than distances L1, L2, and L3. After dragging began, the handle starting location 102 indicated that one less handle is available for placing on the interactor 100 by showing that 0 handles remain available. When the fourth handle 112 is dropped onto the interactor 100, the fourth handle 112 is assigned an absolute value of 20 based on its position on the interactor 100 and is assigned a rank of 4 because it is placed the furthest from the right end of the interactor 100 than any of the other handles on the interactor 100. Accordingly, the rank of the other handles 106, 108, 110 are unchanged.

Referring now to FIGS. 2A-2B, an example interaction with handles 106, 108, 110, 112 on an interactor 100 is depicted. FIGS. 2A-2B depict an example interaction of hovering a cursor 104 near a group of handles 106, 108, 110, causing the handles 106, 108, 110 to reposition thereby allowing easier access to the handles and more precise placement of handles on the interactor 100. It should be understood that the embodiment as shown in FIGS. 2A-2B is intended to be exemplary and is not intended to be limiting. The location and orientation of the repositioning of the handles 106, 108, 110, 112 are arbitrary. Additionally, embodiments are not limited to four handles nor are embodiments limited to how they are placed onto the interactor.

Referring now to FIG. 2A, an interactor 100 with a group of handles 106, 108, 110 and a cursor 104 away from the group of handles 106, 108, 110 are depicted. A user may position the handles 106, 108, 110, 112 such that handles 106, 108, 110 are overlapping, or nearly so, to show that there is a slight difference in preference between handles 106, 108, 110, especially when compared to handle 112, which is positioned a significant distance from handles 106, 108, 110. If the handles are overlapping, it may be difficult for the user to reach the overlapped handles with the cursor 104. It may also be difficult to precisely position a handle if other handles are obstructing the user's view of the interactor 100.

To remedy these problems, embodiments may reposition handles that are too close together. To reposition, it is determined whether a first handle is within a threshold distance of a second handle. The threshold distance may be a predetermined, arbitrary distance. If a first handle is within the threshold distance of a second handle, then the first and second handle may be repositioned along an axis 202 substantially perpendicular to the interactor 100. In some embodiments, reposition may occur when the cursor 104 is hovering near or over the interactor 100. Additionally or alternatively, repositioning may only occur when the cursor 104 is hovering near or over one of the handles in a group of handles within a threshold distance. In some embodiments, repositioning may also occur while handles are being positioned onto the interactor 100, as in FIGS. 1A-1E.

For example, FIG. 2A depicts the interactor 100 with four handles 106, 108, 110, 112. The interactor 100 is a horizontal slider having handles arranged thereon. Three of the handles 106, 108, 110 are against and/or overlapping with each other. Assuming that the threshold distance that handles may be placed from one another is such that it includes handles that are against and/or overlapping with each other, the handles 106, 108, 110 form a group of handles that may be repositioned when interacted with by the cursor 104. Here, the cursor 104 is hovering away from the group of handles 106, 108, 110. Because the position of the cursor 104 indicates that the user is not attempting to interact with the handles 106, 108, 110, the handles 106, 108, 110 remain on the interactor 100 without repositioning.

Referring now to FIG. 2B, an interactor 100 with a group of handles 106, 108, 110 and a cursor 104 near the group of handles 106, 108, 110 are depicted. Embodiments may reposition handles that are too close together. To reposition, it is determined whether a first handle is within a threshold distance of a second handle. If the first handle is within a threshold distance of the second handle, one or both of the handles may be moved onto a new axis. In some embodiments, only the handles in the group of handles that are within a threshold distance of each other that are not being interacted with may be repositioned. For example, if the cursor 104 is hovering over the first handle, then the second handle may be repositioned so that the first handle remains on the interactor 100. The new axis may be a vertical axis 202 that is perpendicular to the interactor 100, and repositioned handles may be placed thereon. It should be understood that the axis 202 may be of any orientation or a range of orientations, such as 80 to 100 degrees, where 90 degrees is perpendicular to the interactor 100. It should also be understood that handles may be placed onto the axis 202 at any position, such as a handle is adjacent to, overlapping with, or centered on the axis 202.

Here in FIG. 2B, the cursor 104 has moved from its previous position between handle 112 and handles 106, 108, 110, as shown in FIG. 2A, to a position on handle 110. The cursor 104 is hovering over the handle 110. To help the user more accurately determine the position of the handle 110 on the interactor 100, the adjacent and/or overlapping handles 106, 108 are arranged onto a vertical axis 202. The vertical axis 202 may be visible or invisible to the user. The handles may be touching the axis 202. The handles 106, 108 may remain in the orientation as shown in FIG. 2B while the cursor 104 is on the handle 110. If the cursor 104 moves onto another handle, such as handle 106, the handles may reposition such that handle 106 is on the interactor 100 and handles 108, 110 are placed on the vertical axis 202.

Referring now to FIG. 3A, an interactor 100 with a group of handles 106, 108, 110 and a cursor 104 hovering over a handle 112 away from the group of handles 106, 108, 110 is depicted. Handles may have metadata and other information attributed to them so that users may know what they are ranking on the interactor 100. To view metadata about a handle, the user may interact with the handle. Interactions may include hovering, clicking, dragging, and the like. Upon interaction, metadata may appear as a bubble originating from the handle. It should be understood that the metadata may appear anywhere in relation to the interactor 100. In some embodiments, the handles may display the metadata and the rank and absolute value of the handle may be presented upon interaction with the handle.

For example, FIG. 3A depicts the interactor 100 of FIG. 2A. The cursor 104 is hovering over handle 112. Hovering is an interaction that causes handle 112 to display its metadata 302. The metadata 302 for handle 112 is "Apples." Therefore, it is understood that the user who placed the handles 106, 108, 110, 112 onto the interactor 100 ranked "Apples" as last among three other options. It is also understood that the user strongly dislikes "Apples" when compared to the other available options in handles 106, 108, 110 because the absolute value of handle 112 is significantly less than that of handles 106, 108, 110.

Referring now to FIG. 3B, an interactor 100 with a group of handles 106, 108, 110 and a cursor 104 hovering over the group of handles 106, 108, 110 are depicted. Interactions may result in a combination of behaviors from the interactor 100. Interactions may include hovering, clicking, dragging, and the like by the cursor 104, if a cursor is used, and behaviors of the interactor 100 may include displaying metadata, moving a handle along the interactor 100, reposition a handle along a vertical axis, and the like.

For example, FIG. 3B depicts the interactor 100 of FIG. 3A. The cursor 104 is hovering over handle 108. Hovering is an interaction that causes the handle 108 to display its metadata 304. The metadata 304 for the handle 108 is "Oranges." Hovering is an interaction that also causes handles that are within a threshold distance of each other to reposition. Assuming that the threshold distance that handles may be placed from one another is such that it includes handles that are against and/or overlapping with each other, the handles 106, 108, 110 form a group of handles that may be repositioned when interacted with by the cursor 104. Because the handle 108 was overlapping with the handle 110 before interaction with the handle 108 by the cursor 104, as shown in FIG. 3A, the handle 108 is repositioned to more clearly show a text bubble containing the metadata 304 of the handle 108.

Figure 4A:
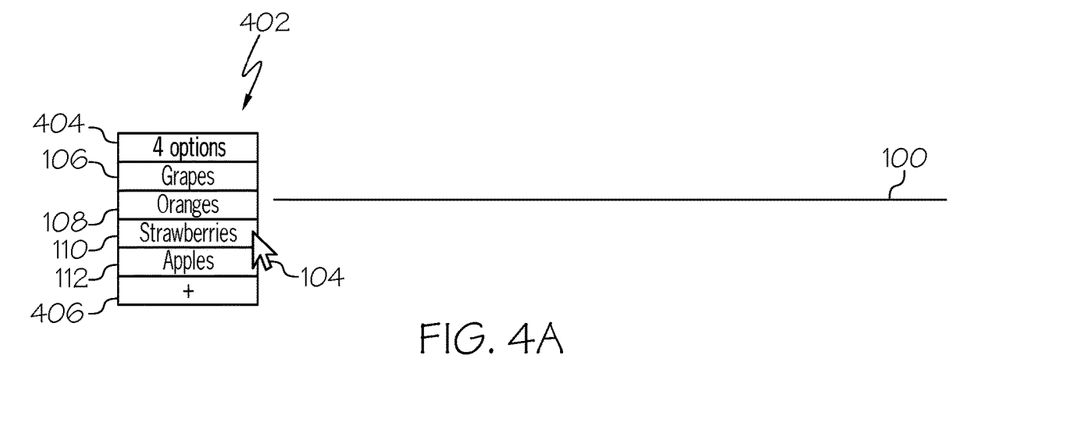
FIG. 4A depicts an interactor and a list of handles, according to one or more embodiments shown and described herein.

Referring now to FIG. 4A, an interactor 100 and a list of handles 402 are depicted. The handle starting location may include a list of handles 402. The list of handles 402 may include a count of options available 404, the metadata of each handle 106, 108, 110, 112, the handles 106, 108, 110, 112, a button 406 for adding new handles, and combinations thereof. It should be understood that the list of handles 402 may be at any location relative to the interactor 100, such as adjacent to the interactor 100. It should also be understood that the button 406 may also have or instead be a text box for the user to enter the metadata of a new handle.

For example, FIG. 4A depicts the interactor 100 with a list of handles 402. The list 402 has four handles that represent options for a user to place on the interactor 100 as indicated by the count of options available 404. The handles are "Grapes" 106, "Oranges" 108, "Strawberries" 110, and "Apples" 112. The list 402 also has a button 406 for adding additional handles.

Figure 4B:
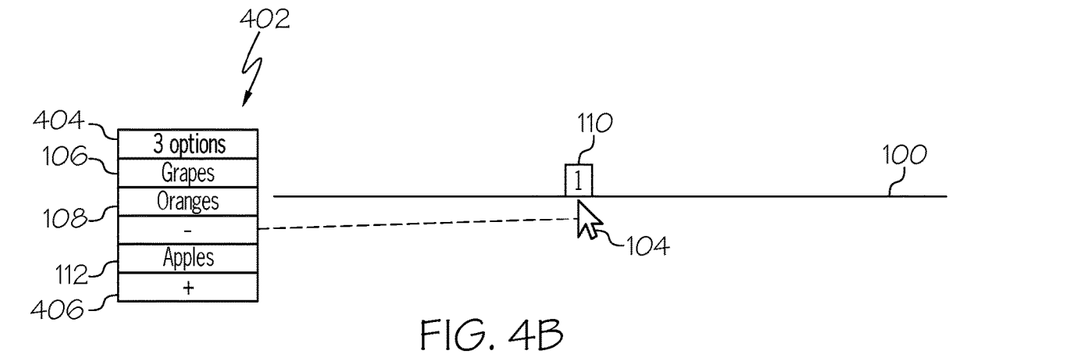
FIG. 4B depicts an interactor with one handle and a list of handles, according to one or more embodiments shown and described herein.

Referring now to FIG. 4B, an interactor 100 with one handle 110 on the interactor 100 and a list of handles 402 are depicted. Handles may be dragged from the list 402 onto a position on the interactor 100. Dragging a handle onto the interactor 100 may comprise clicking on the handle on the list 402 with the cursor 104 and dragging from the list 402 to a location on the interactor 100. In some embodiments, the handle 110 may emerge from the list 402 and follow the cursor 104 as it is being dragged onto the interactor 100. When the handle 110 is dragged away from the list 402, the count of options available 404 may indicate a new number of available handles. When the handle 110 is dropped onto the interactor 100, the handle 110 may be assigned an absolute value based at least in part on its position on the interactor 100 and may be assigned a first rank. In some embodiments, the absolute value may be displayed based at least in part on the position of the handle as its being dragged.

For example, FIG. 4B depicts the interactor 100 of FIG. 4A with one handle 110. The cursor 104 began at the list 402, as shown in FIG. 4A, clicked the list 402, and dragged a first handle 110 from the list 402 onto the interactor 100, as shown by the dashed line. After the dragging begins, the list 402 indicates that one less handle is available for placing on the interactor 100 by showing that only 3 handles remain available at the count of options available 404 as well as removing the handle from the list 402. When the first handle 110 is dropped onto the interactor 100, the first handle 110 is assigned an absolute value of 60 based on its position on the interactor 100 and is assigned a rank of 1 because it is the only handle on the interactor 100.

Figure 4C:
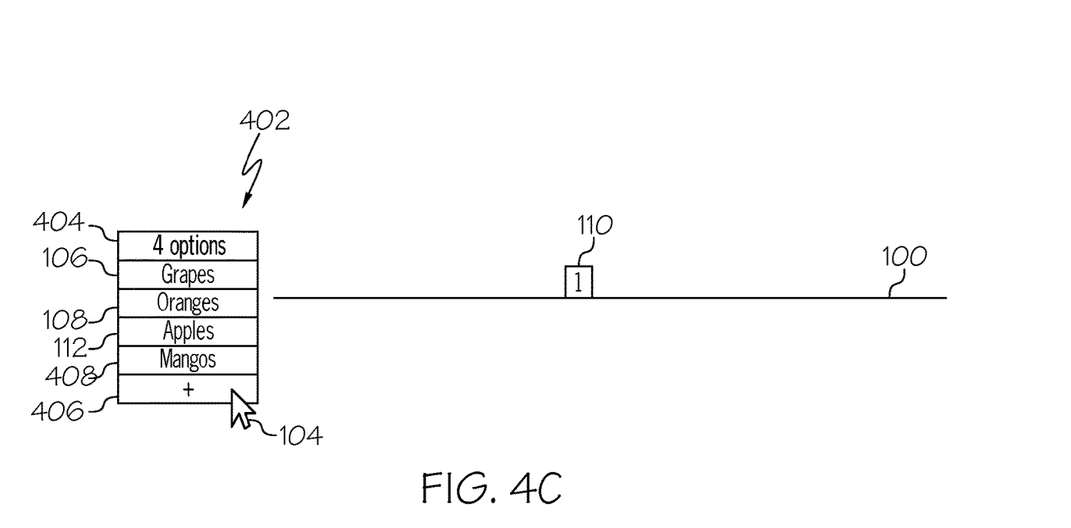
FIG. 4C depicts an interactor with one handle and a list of handles with a newly added handle, according to one or more embodiments shown and described herein.

Referring now to FIG. 4C, an interactor 100 with one handle 110 and a list of handles 402 with a new handle 408 are depicted. The list of handles 402 may have a button 406 for adding additional handles. Interacting with the button 406 by the cursor 104 may generate a text box, dropdown list, or any other input field for receiving an input from a user. The input received from the user may become a new handle 408 on the list 402, and the count of available options 404 may be adjusted accordingly. In some embodiments, the button 406 and/or any corresponding input fields may be located anywhere relative to the interactor 100 and need not be alongside the list 402. It should be understood that the embodiments described in FIGS. 4A-4C may include any of the features described in other figures, such as displaying metadata upon hovering the cursor 104 over a handle and reposition handles that are placed within a threshold distance of each other upon interaction in the cursor 104.

For example, FIG. 4C depicts the interactor 100 of FIG. 4B with one handle 110. The cursor 104 clicked on button 406 to receive input from the user to create a new handle. The user input "Mangos" to create a new handle 408 as shown in list 402. The count of available options 404 was adjusted to account for the new handle 408, showing that there are "4 options" for handles that may be placed on the interactor 100.

Figure 5:
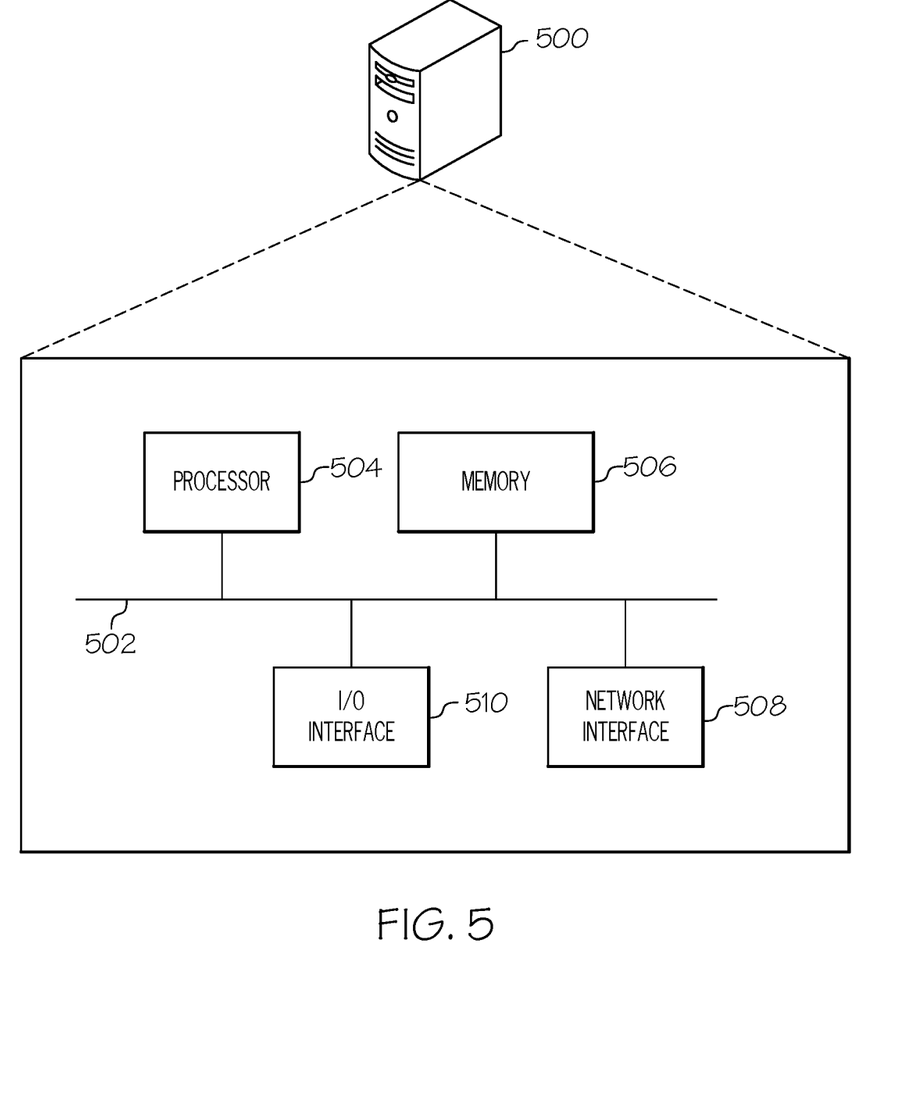
FIG. 5 depicts a system for ranking on an absolute scale, according to one or more embodiments shown and described herein.

Referring now to FIG. 5, a system 500 for ranking on an absolute scale is depicted. The system 500 may be a computer system having a processor 504, memory 506, network interface 508, and I/O interface 510 as well as a communication path 502 for communicatively connecting the foregoing components. In some embodiments, the system 500 may be a web server that generates a user interface for ranking on an absolute scale and transmits it to a client computer for the client computer to present to a user on a web browser. In some embodiments, the system 500 may be a desktop computer that generates a user interface for ranking on an absolute scale to present to a user on a computer application.

The processor 504 may include one or more processor modules that may be any device capable of executing machine readable and executable instructions. Accordingly, each of the one or more processors of the processor 504 may be a controller, an integrated circuit, a microchip, or any other computing device. The processor 504 is coupled to the communication path 502 that provides signal connectivity between the various components of the system 500. Accordingly, the communication path 502 may communicatively couple any number of processors 504 with one another and allow them to operate in a distributed computing environment. Specifically, each processor 504 may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

The communication path 502 may be formed from any medium that is capable of transmitting a signal such as, e.g., conductive wires, conductive traces, optical waveguides, and the like. In some embodiments, the communication path 502 may facilitate the transmission of wireless signals, such as Wi-Fi, Bluetooth, Near-Field Communication (NFC), and the like. Moreover, the communication path 502 may be formed from a combination of mediums capable of transmitting signals. In one embodiment, the communication path 502 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory 506 is communicatively coupled to the communication path 502 and may contain one or more memory modules comprising RAM, ROM, flash memories, hard drives, or any device capable of storing machine readable and executable instructions such that the machine readable and executable instructions can be accessed by the processor 504. The machine readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine readable and executable instructions and stored on the memory 506. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory 506 may also include a non-transitory, machine-readable medium. The memory 506 may also store data for implementing embodiments of ranking on an absolute scale described herein including, for example, handles, handle metadata, handle locations, handle rankings and values, interactor configurations, and any other data and settings related to the interactor and handles.

The input/output interface 510 (I/O interface 510) is communicatively coupled to the communication path 502 and is used in part to receive data from and present data to a user. The I/O interface 510 can be any device or set of devices capable of generating input or output. For example, devices that can generate input may include a keyboard, a mouse, a touchscreen, a microphone, a camera, and any other input device. Devices that can generate output may include a graphics card, a monitor, a speaker, and any other output device. The system 500 may receive input from a mouse via the I/O interface 510 for moving a cursor and interacting with handles, interactors, and the like. The system 500 may also generate output to a monitor via the I/O interface 510 for presenting a user interface having handles, interactors, and the like to a user.

The network interface 508 is communicatively coupled to the communication path 502. The network interface 508 can be any device or set of devices capable of transmitting and/or receiving data via a network or other communication mechanisms. Accordingly, the network interface 508 can include a communication transceiver for sending and/or receiving any wired or wireless communication. For example, the network interface 508 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices. The network interface 508 may communicatively connect the system 500 to external systems, such as external devices, via a network. The network may be a wide area network, a local area network, a personal area network, a cellular network, a satellite network, and the like. External devices may include computer devices that operate beyond the system 500 that may present an interactor and handles generated by the system 500 in a client-server mode, where end-user computers are clients and the system 500 is a webserver. External devices may also be a web server for retrieving the interactor, handles, metadata, or combinations thereof to display on an electronic display via the I/O interface 510.

It should be understood that the components illustrated in FIG. 5 are merely illustrative and are not intended to limit the scope of this disclosure. More specifically, while the components in FIG. 5 are illustrated as residing within system 500, this is a non-limiting example. In some embodiments, one or more of the components may reside external to system 500. In some embodiments, the system 500 may exist as a virtual machine operating within a host machine alongside other virtual machines, each of which shares the same computing resources belonging to the host machine.

It should now be understood that embodiments described herein are directed to systems, methods, and non-transitory machine-readable mediums for ranking on an absolute scale. The present disclosure provides a type of user input that addresses the issue of being able to rank and assign a value to a set of options. The input includes an interactor and a set of handles. The handles may be dragged onto the interactor. When a handle is dragged and dropped onto an interactor, the handle may be assigned a rank and an absolute value. The handle may contain metadata and may be displayed when the user interacts with a handle and/or interactor. The handles on an interactor may be repositioned to more clearly present one or more handles to the user when the user interacts with a handle and/or interactor. Embodiments of the present disclosure may apply to any kind of system for receiving user input regarding a set of options.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining embodiments of the present disclosure, it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method for ranking on an absolute scale, the method comprising:
    displaying, on an electronic display, a first handle, a second handle, and an interactor, wherein the interactor comprises a first end and a second end, where the interactor is configured to have a minimum value corresponding to the first end and a maximum value corresponding to the second end;
    determining a value of the first handle based on a position of the first handle on the interactor, in response to a user dragging the first handle on the interactor;
    determining a rank of the first handle based on the value of the first handle, in response to the user dragging the first handle on the interactor;
    determining a value of the second handle based on a position of the second handle on the interactor, in response to the user dragging the second handle on the interactor;
    determining a rank of the second handle based on the values of the first and second handles, in response to the user dragging the second handle on the interactor; and
    updating the value and the rank of the first handle based on the position of the first handle relative to the second handle, in response to the user dragging the second handle on the interactor.

2. The method of claim 1, further comprising displaying a metadata of at least one handle in response to hovering over at least one of a handle and the interactor.

3. The method of claim 1, further comprising generating the first handle and the second handle at a handle starting location adjacent to the interactor.

4. The method of claim 1, further comprising generating a list of handles comprising the first handle and the second handle adjacent to the interactor.

5. The method of claim 1, further comprising:
    generating a user input area; and
    generating a new handle in response to a user input in the user input area.

6. The method of claim 1, further comprising:
    determining whether the first handle is within a threshold distance of the second handle; and
    repositioning at least one of the first handle and the second handle along a perpendicular axis of the interactor in response to determining that the first handle is within the threshold distance of the second handle.

7. The method of claim 6, wherein
the interactor is a horizontal sliding scale having the first and second handles arranged thereon; and
the first and second handles are arranged on a vertical axis in response to repositioning such that the vertical axis intersects a location of the interactor.

8. A system for ranking on an absolute scale, the system comprising:
a processor;
an electronic display;
a memory module communicatively coupled to the processor; and
a set of machine-readable instructions stored on the memory module that, when executed by the processor, cause the processor to perform operations comprising:
displaying, on an electronic display, a first handle, a second handle, and an interactor, wherein the interactor comprises a first end and a second end, where the interactor is configured to have a minimum value corresponding to the first end and a maximum value corresponding to the second end;
determining a value of the first handle based on a position of the first handle on the interactor, in response to a user dragging the first handle on the interactor;
determining a rank of the first handle based on the value of the first handle, in response to the user dragging the first handle on the interactor;
determining a value of the second handle based on the position of the second handle on the interactor, in response to the user dragging the second handle on the interactor;
determining a rank of the second handle based on the values of the first and second handles, in response to the user dragging the second handle on the interactor; and
updating the value and the rank of the first handle based on the position of the first handle relative to the second handle, in response to the user dragging the second handle on the interactor.

9. The system of claim 8, further comprising displaying a metadata of at least one handle in response to the user hovering over at least one of a handle and the interactor.

10. The system of claim 8, further comprising generating the first handle and the second handle at a handle starting location adjacent to the interactor.

11. The system of claim 8, further comprising generating a list of handles comprising the first handle and the second handle adjacent to the interactor.

12. The system of claim 8, further comprising:
generating a user input area; and
generating a new handle in response to a user input in the user input area.

13. The system of claim 8, further comprising:
determining whether the first handle is within a threshold distance of the second handle; and
repositioning at least one of the first handle and the second handle along a perpendicular axis of the interactor in response to determining that the first handle is within the threshold distance of the second handle.

14. The system of claim 13, wherein
the interactor is a horizontal sliding scale having the first and second handles arranged thereon; and
the first and second handles are arranged on a vertical axis in response to repositioning such that the vertical axis intersects a location of the interactor.

15. A non-transitory machine-readable medium comprising machine-readable instructions that, when executed by a processor, cause the processor to perform operations comprising:
displaying, on an electronic display, a first handle, a second handle, and an interactor, wherein the interactor comprises a first end and a second end, where the interactor is configured to have a minimum value corresponding to the first end and a maximum value corresponding to the second end;
determining a value of the first handle based on a position of the first handle on the interactor, in response to a user dragging the first handle on the interactor;
determining a rank of the first handle based on the value of the first handle, in response to the user dragging the first handle on the interactor;
determining a value of the second handle based on the position of the second handle on the interactor, in response to the user dragging the second handle on the interactor;
determining a rank of the second handle based on the values of the first and second handles, in response to the user dragging the second handle on the interactor; and
updating the value and the rank of the first handle based on the position of the first handle relative to the second handle, in response to the user dragging the second handle on the interactor.

16. The operations of claim 15, further comprising:
determining whether the first handle is within a threshold distance of the second handle; and
repositioning at least one of the first handle and the second handle along a perpendicular axis of the interactor in response to determining that the first handle is within the threshold distance of the second handle.

17. The operations of claim 15, further comprising displaying a metadata of at least one handle in response to the user hovering over at least one of a handle and the interactor.

18. The operations of claim 15, further comprising generating the first handle and the second handle at a handle starting location adjacent to the interactor.

19. The operations of claim 15, further comprising generating a list of handles comprising the first handle and the second handle adjacent to the interactor.

20. The operations of claim 15, further comprising:
generating a user input area; and
generating a new handle in response to a user input in the user input area.

* * * * *